(12) United States Patent
Garcia et al.

(10) Patent No.: US 7,976,756 B2
(45) Date of Patent: Jul. 12, 2011

(54) AQUA TILES

(76) Inventors: Luciano Martinez Garcia, Santa Fe, NM (US); Elvia Guadalupe Garcia, Santa Fe, NM (US)

( * ) Notice: Subject to any disclaimer, the term of this patent is extended or adjusted under 35 U.S.C. 154(b) by 42 days.

(21) Appl. No.: 12/454,811

(22) Filed: May 22, 2009

(65) Prior Publication Data

US 2010/0295208 A1  Nov. 25, 2010

(51) Int. Cl.
*B28B 7/22* (2006.01)
(52) U.S. Cl. . 264/255; 264/257; 264/258; 264/DIG. 57; 156/60; 156/63; 156/307.1; 427/68; 427/407.1
(58) Field of Classification Search .......... 156/60, 156/63, 307.1; 427/68, 407.1; 264/255, 264/257–258, DIG. 57
See application file for complete search history.

(56) References Cited

U.S. PATENT DOCUMENTS

| | | | | |
|---|---|---|---|---|
| 5,354,396 A * | 10/1994 | Danico et al. | | 156/63 |
| 6,403,004 B1 | 6/2002 | Stecker | | |
| 6,568,146 B2 | 5/2003 | Harvey | | |
| 6,911,236 B2 * | 6/2005 | Stanley | | 427/389.7 |
| 2003/0168770 A1* | 9/2003 | Young | | 264/129 |
| 2004/0077750 A1* | 4/2004 | Sapper | | 523/171 |
| 2005/0019542 A1* | 1/2005 | Hojaji et al. | | 428/304.4 |

* cited by examiner

*Primary Examiner* — Yogendra N Gupta
*Assistant Examiner* — Amjad Abraham
(74) *Attorney, Agent, or Firm* — Walter A. Michel

(57) ABSTRACT

A process for producing mosaics, tiles or various figures where the construction of these items retains the article or design inside the mosaic, tile or figure. The article or design may be of many different themes, such as underwater life including fish, shells and sea plants. Other themes might include, but not be limited to, trees, flowers, vegetables, fruits, etc. These finished mosaics, tiles or figures can be displayed anywhere that will allow the mounting of a tile such as in bathrooms, on walls, ceilings, floors, swimming pools (interior or exterior), etc.

4 Claims, 6 Drawing Sheets

AQUA TILES

FIELD OF THE INVENTION

The invention is in the field of embedding in one or several mosaics, tiles, or figures, of different dimensions and themes, such as sea animals, tropical fish, sharks, whales, shells, pearls, sea horses, sea plants, fruits, vegetables, and the list could go on. The mosaics, tiles or figures are constructed to retain the desired article or design inside the mosaic, tile, or figure.

BACKGROUND OF THE INVENTION

Decorative articles such as tiles, mosaics, etc. are very common and are basically a ceramic substrate covered by a painted design and then protected with some form of a finish seal coat. These articles have limitations, such as a flat appearance and, depending on where they are mounted, they have a limited wear factor. Attempts have been made to overcome some of the above mentioned short-comings. U.S. Pat. No. 6,911,236 B2 issued on Jun. 28, 2005 to James M. Stanley describes a coating composition, when applied to glass or ceramic substrate, produces a coating that can withstand repeated cleanings without significant peeling, cracking, flaking or discoloration. U.S. Pat. No. 6,568,146 B2 issued May 27, 2003 to James Harvey discloses a method of manufacturing a slow-moisture penetrating decorative floor surface. Finally, U.S. Pat. No. 6,403,004 B1 describes a process for producing a decorative article having a face layer of multiple laminae. However, there have been no disclosures relating to the method of producing a decorative mosaic, tile, or figure similar to the present invention.

BRIEF SUMMARY OF THE INVENTION

The invention discloses a method of creating mosaics, tiles and figures which encompasses several unique steps in the process and results in mosaics, tiles or figures with a three dimensional appearance and which are constructed to retain the desired articles or design inside the mosaic, tile, or figure.

DETAILED DESCRIPTION OF A PREFERRED EMBODIMENT

Figure 1A:
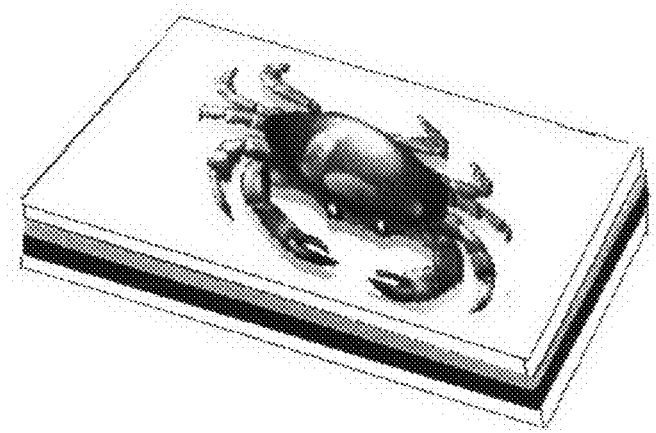
FIG. 1a, b, and c show different possible aquatic animals and different shapes of mosaics, tiles or figures.
Figure 1B:
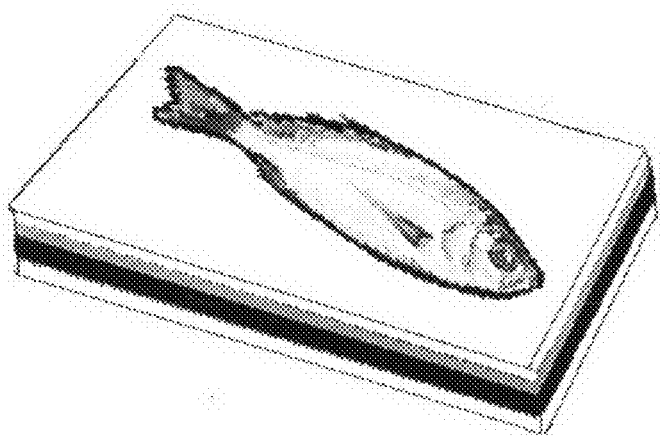
Figure 1C:
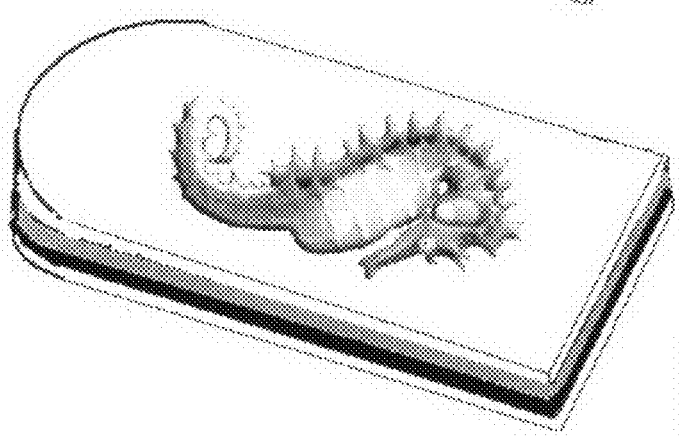
Figure 2A:
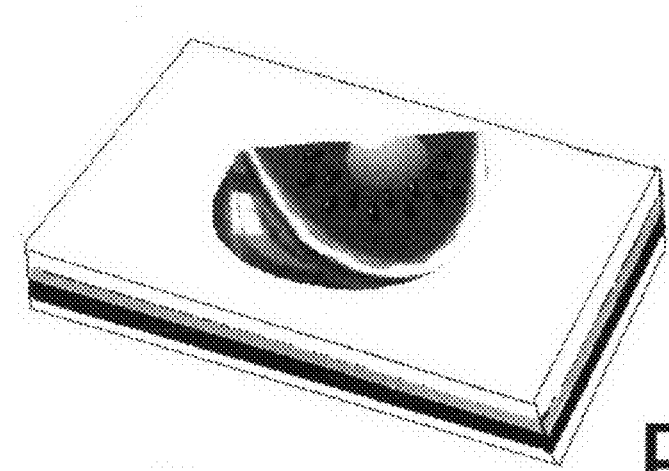
FIG. 2a, b, and c show different possible fruits and different shapes of mosaics, tiles or figures.
Figure 2B:
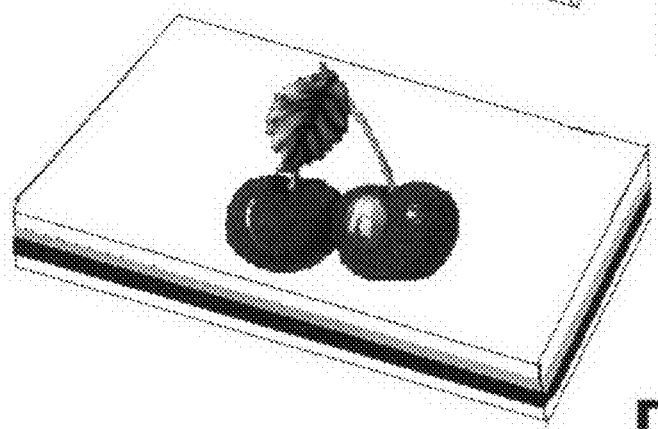
Figure 2C:
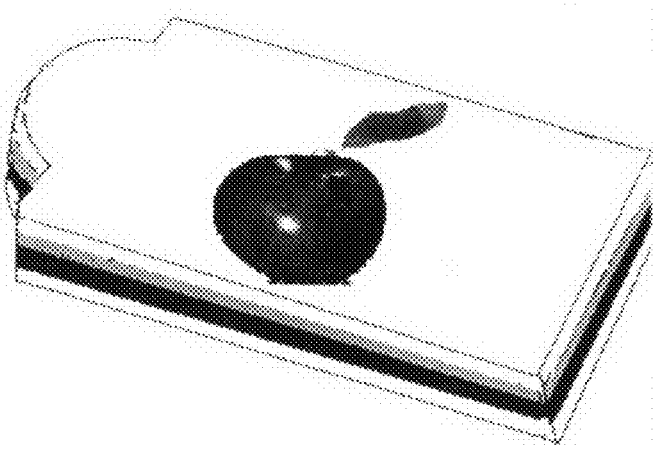
Figure 3:
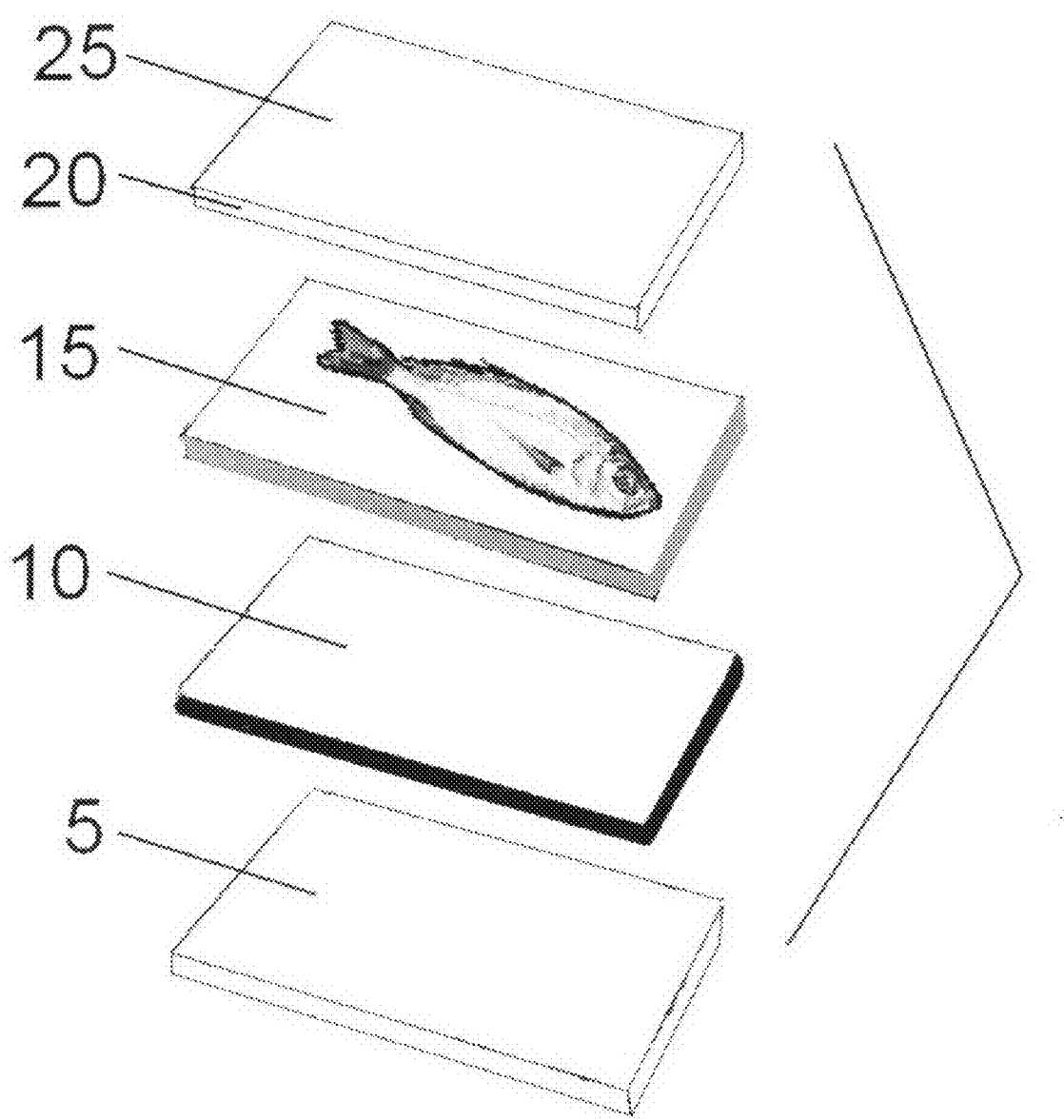
FIG. 3 is an exploded view of the parts of FIG. 1b.
Figure 4A:
FIGS. 4a and b show possible different embedded scenes and configurations of the mosaics, tiles or figures.
Figure 4B:
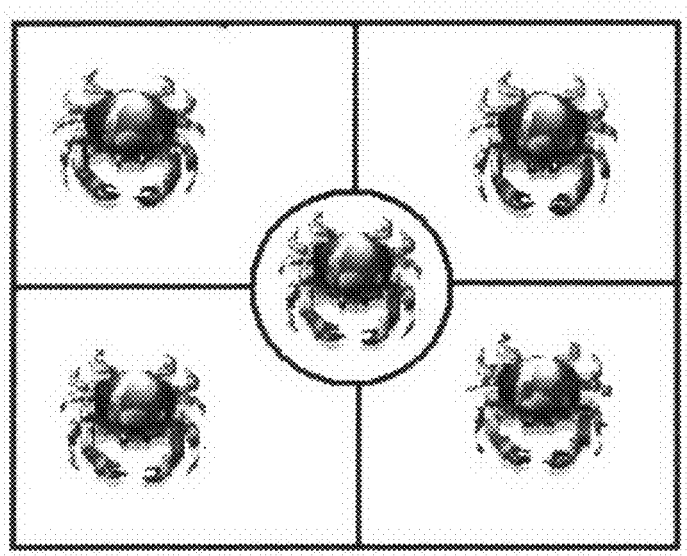
Figure 5:
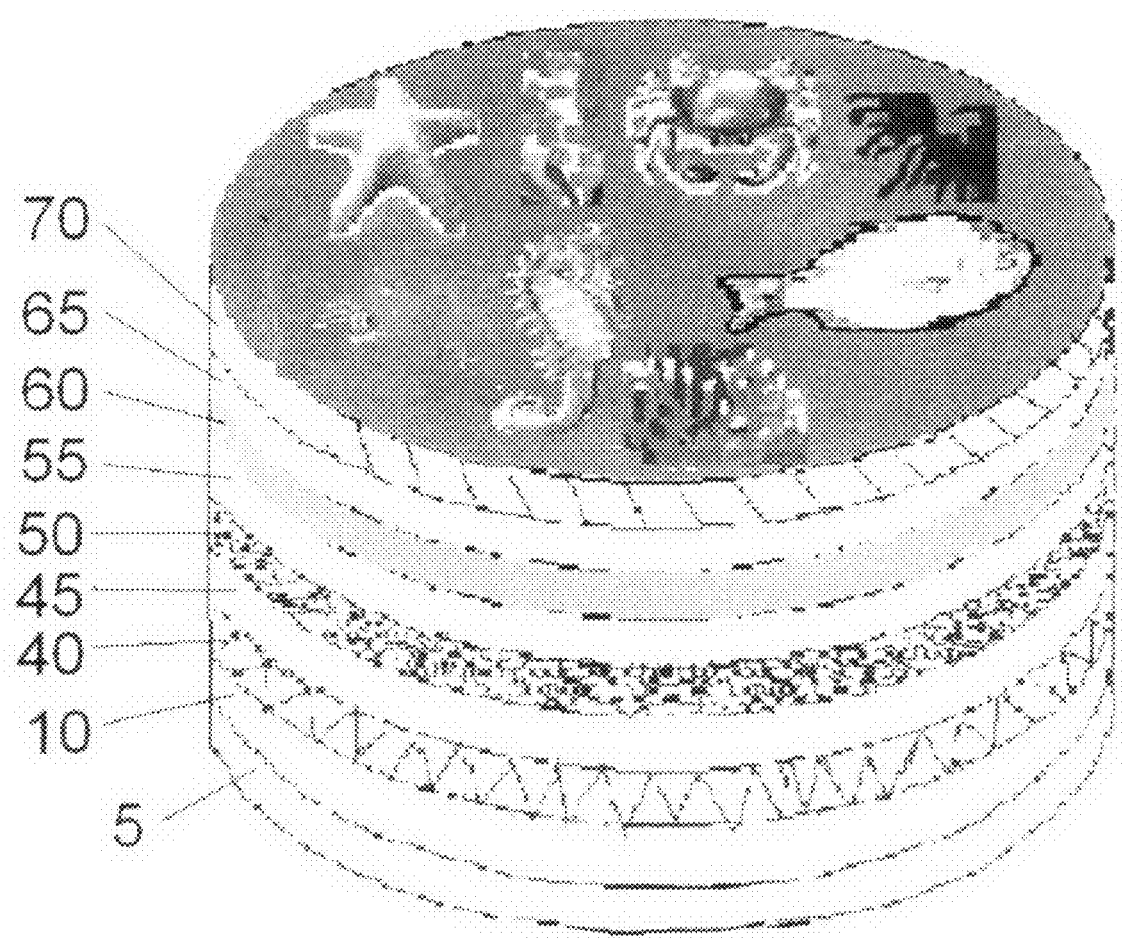
FIG. 5 is a more complicated configuration of multiple embedded designs

The following description is by no means the only embodiment foreseen by this disclosure and it should be noted that the entire process is performed at room temperatures without the use of any ovens or enhanced drying/curing devices. There are many varieties of shapes of tiles which can be used as well as many varieties of imbedded designs, figures, etc. For example, FIGS. 1a, 1b and 1c show three different varieties of aquatic life which might be used and also FIG. 1c displays a different shape. FIGS. 2a, 2b and 2c show three different types of food which might be used and FIG. 2c also shows a different shape. FIG. 4a displays an aquatic background which might be used, while FIG. 4b displays a different arrangement. FIG. 5 demonstrates the many possible arrangements which might be envisioned with the use of the described method. Two methods will be described since they are of different thicknesses and require a slightly different process. The first process addresses tiles, mosaics or figures that may be imbedded into walls, ceilings, floors, or swimming pools, but not limited to such. These tiles, etc. would be approximately ¼" to 1" in thickness and are shown in the exploded view of FIG. 3. This fabrication process should be performed in a well ventilated area with temperatures between approximately 65 and 75 degrees Fahrenheit. The temperatures and following curing times are approximate depending on various factors such as winter (0° to 32° Fahrenheit) or summer environment, humidity, altitude, thickness of the tile, etc. It should also be noted that whenever the use of a base coat of resin is described, it is critical to the process to add the appropriate amount of hardener in order to allow the addition of imbedded objects prior to the hardener taking effect. The first step in fabricating a tile, etc. with multiple sides, is to make a frame from a clear material called plate form flexy glass (5). This frame forms the base and the side walls. The frame will vary in size based on the dimensions of the article that will be displayed in the tile, etc. Once the frame is created, the next step is to pour a base coat (10) (resin) into the frame and let it set for approximately 2 to 5 hours and place the desired paper sticker or design articles (15) on the base coat (10) before said base coat completely hardens and pour another coat of (resin) to seal the article and let it set for approximately 10 to 20 hours. The forgoing step could be repeated if the final design calls for more articles imbedded in the tile. After the set time of the previous step, pour another base coat (type 2) with colors (20) and let dry/cure for approximately 20 to 25 days. If the final use of this process is to be in an environment below 32° Fahrenheit, the process is altered slightly by adding an additional layer of flexy glass (5) and adding two to three coats of hard finish sealer (25) and then allowing the dry/cure process to take place at approximately −10° to −15° Fahrenheit for approximately 5 to 10 days. Finally, if the tile, etc is free from any cracks or defects, apply a hard finish sealer (25) and let dry/cure for approximately 5 to 7 hours.

Figure 6:
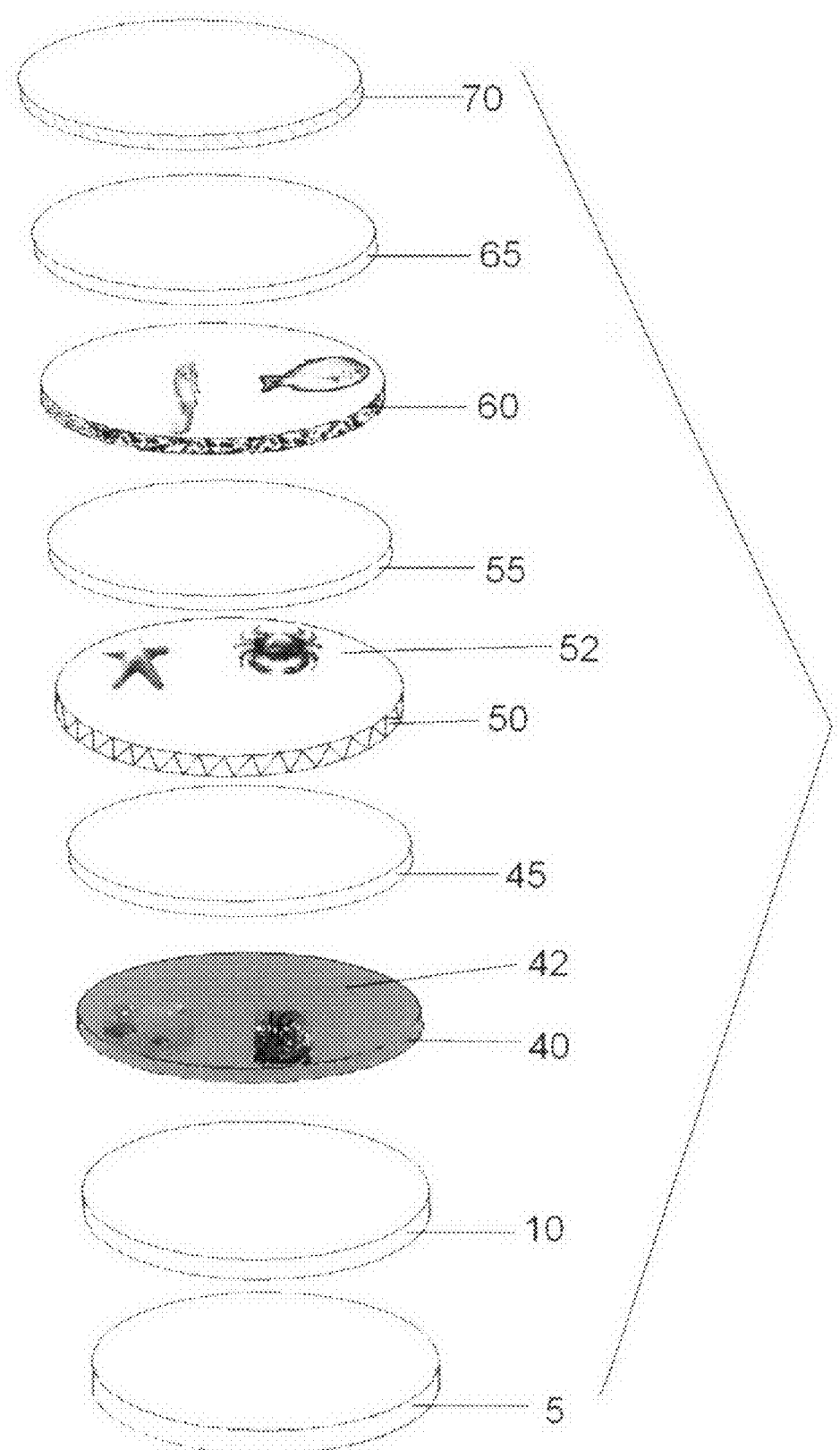
FIG. 6 is an exploded view of FIG. 5

The second process is intended for thicker tiles which would display a much greater three dimensional appearance. Again, this fabrication process should be performed in a well ventilated area with temperatures between approximately 65 and 75 degrees Fahrenheit. These tiles, etc. would be of 1" to 4" or more in thickness and are shown in the exploded view of FIG. 6. Here again, the first step in fabricating a tile, etc. with multiple sides, is to make a frame from a clear material called plate form flexy glass (5). This frame forms the base and the side walls. Once the frame is created, the next step is to pour a base coat (resin) (10) into the frame and let it set for approximately 2 to 5 hours and place first paper, sticker, or design articles (40) on the base coat (10) before said base coat completely hardens and also add first color background (42), if desired. Prepare plate flexy glass (45) and let set for approximately 2 to 5 hours. Next apply second sticker, design articles (50) before said base coat completely hardens and color can be added here as a second color background (52). Now add base coat type 2 with colors according to design (55) and let set for approximately 2 to 5 hours. Now add a third paper, sticker, design articles (60) before said base coat completely hardens and again let set for approximately 2 to 5 hours. The forgoing process could be repeated as many times as desired and only constrained by the final thickness. This second process will be sufficient for environments as harsh as approximately 0° to −15° Fahrenheit. Finally, add the last base coat type 2 (65) and allow to dry/cure for approximately 30 to 35 days and then inspect for defects. If no defects, apply a hard finish seal, last coat (70) and let dry/cure for approximately 5 to 7 hours.

It is obvious that many variations of shape and imbedded articles can be envisioned. Therefore, it is intended that any modifications of the described method are intended to be included and falling within the broad spirit and scope of the foregoing disclosure, the following claims and appended drawings.

What is claimed is:

1. A process and/or method of manufacturing multi-layered mosaics, tiles, figures, or other objects limited in thickness to approximately 1 inch or 4 inches and intended for mounting on floors, walls, ceilings, swimming pools or any other locations wherein said multi-layered mosaics, tiles, figures or other objects contain figures, designs or three dimensional objects imbedded within said multi-layered mosaics, tiles, figures or other objects comprising the steps of:
   a. making a frame, which forms a base and side walls, from a clear material referred to as plate form flexy glass;
   b. pouring a first base coat resin into said frame;
   c. allowing said first base coat resin to set for approximately 2 to 5 hours;
   d. adding an imbedded object to said first base coat resin; wherein the imbedded object is a three dimensional object;
   e. pouring a second base coat resin to seal said imbedded object;
   f. allowing said second base coat resin to set for approximately 10 to 20 hours;
   g. pouring additional layers of said first or second base coat resins;
   h. adding additional imbedded objects if called for;
   i. pouring a third base coat with colors;
   j. limiting final thickness to 1 inch or 4 inches;
   k. allowing said third base coat with colors to dry/cure for approximately 20 to 25 days;
   l. inspecting for cracks or defects;
   m. applying a protective layer which forms a solid coating;
   n. allowing said protective layer which forms a solid coating to dry/cure for approximately 5 to 7 hours and
   o. performing above steps a. thru n. while maintaining a well ventilated area with temperatures between approximately 65 and 75 degrees Fahrenheit.

2. The process and/or method of claim 1 limited in thickness to approximately 4 inches and further comprising the steps of:
   a. adding additional embedded objects if called for;
   b. pouring additional base coats with colors if called for and
   c. limiting final thickness to approximately 4 inches.

3. A process and/or method of manufacturing multi-layered mosaics, tiles, figures or other objects limited in thickness to approximately 1 inch or 4 inches and intended for mounting on floors, walls, ceilings, swimming pools or any other locations wherein said multi-layered mosaics, tiles, figures or other objects contain figures, designs or three dimensional objects imbedded within said multi-layered mosaics, tiles, figures or other objects and intended for use in an environment between 0 degrees and −15 degrees Fahrenheit, comprising the steps of:
   a. making a frame, which forms a base and side walls, from a clear material referred to as plate form flexy glass;
   b. pouring a first base coat resin into said frame;
   c. allowing said first base coat resin to set for approximately 2 to 5 hours;
   d. adding an imbedded object to said first base coat resin; wherein the imbedded object is a three dimensional object;
   e. pouring a second base coat resin to seal said imbedded object;
   f. allowing said second base coat resin to set for approximately 10 to 20 hours;
   g. pouring additional layers of said first or second base coat resins;
   h. addling additional imbedded objects if called for,
   i. pouring a third base coat with colors;
   j. limiting final thickness to 1 inch or 4 inches;
   k. allowing said third base coat with colors to dry/cure at approximately −10 to −15 degrees for approximately 5 to 10 days;
   l. inspecting for cracks or defects;
   m. applying a protective layer which forms a solid coating and
   n. allowing said protective layer which forms a solid coating to drye/cure for approximately 10 to 20 hours.

4. The process and/or method of claim 3 limited in thickness to approximately 4 inches and further comprising the steps of
   a. adding additional embedded objects if called for;
   b. pouring additional base coats with colors if called for and
   c. limiting final thickness to approximately 4 inches.

\* \* \* \* \*